(12) United States Patent
Bartolucci et al.

(10) Patent No.: US 11,463,452 B2
(45) Date of Patent: Oct. 4, 2022

(54) SYSTEMS AND METHODS FOR RANDOM DIFFERENTIAL RELAY AND NETWORK CODING

(71) Applicant: nChain Licensing AG, Zug (CH)

(72) Inventors: Silvia Bartolucci, London (GB); Simone Madeo, London (GB)

(73) Assignee: nChain Licensing AG, Zug (CH)

(*) Notice: Subject to any disclaimer, the term of this patent is extended or adjusted under 35 U.S.C. 154(b) by 0 days.

(21) Appl. No.: 17/040,015

(22) PCT Filed: Mar. 6, 2019

(86) PCT No.: PCT/IB2019/051782
§ 371 (c)(1),
(2) Date: Sep. 21, 2020

(87) PCT Pub. No.: WO2019/180526
PCT Pub. Date: Sep. 26, 2019

(65) Prior Publication Data
US 2021/0021607 A1    Jan. 21, 2021

(30) Foreign Application Priority Data
Mar. 21, 2018   (GB) ..................................... 1804479

(51) Int. Cl.
*H04L 29/06*   (2006.01)
*H04L 9/40*   (2022.01)
(Continued)

(52) U.S. Cl.
CPC .......... *H04L 63/123* (2013.01); *H04L 1/0009* (2013.01); *H04L 1/0076* (2013.01);
(Continued)

(58) Field of Classification Search
CPC ... H04L 63/123; H04L 1/0009; H04L 1/0076; H04L 63/1441; H04L 67/1078; H04L 67/1097; H04L 9/3239; H04L 2209/38
See application file for complete search history.

(56) References Cited

U.S. PATENT DOCUMENTS 8,473,998 B1   6/2013   Lucani et al.
9,160,440 B1   10/2015  Medard et al.
(Continued)

FOREIGN PATENT DOCUMENTS

CN   106603198 A   4/2017
GB     2519119 A   4/2015

OTHER PUBLICATIONS

Arrobo et al., "New Approaches to Reliable Wireless Body Area Networks," IEEE International Conference on Microwaves, Communications, Antennas and Electronics Systems, Nov. 7-9, 2012, 6 pages.
(Continued)

*Primary Examiner* — Fahmida S Chowdhury
(74) *Attorney, Agent, or Firm* — Davis Wright Tremaine LLP

(57) ABSTRACT

A method of propagating data packets in a network of nodes is disclosed. The method, implemented at one of the nodes, includes: collecting a set of first data packets during a first time period, the set including at least one data packet received from one or more first nodes in the network; obtaining a plurality of encoded data packets, each one of the plurality of encoded data packets being generated by combining two or more first data packets of the set using network coding; determining a mapping of the plurality of encoded data packets and the first data packets of the set to one or more neighbouring nodes connected to the node; and transmitting the plurality of encoded data packets and the
(Continued)

first data packets of the set to the one or more neighbouring nodes according to the determined mapping.

16 Claims, 7 Drawing Sheets

(51) Int. Cl.
  *H04L 1/00* (2006.01)
  *H04L 67/1074* (2022.01)
  *H04L 67/1097* (2022.01)
  *H04L 9/32* (2006.01)

(52) U.S. Cl.
  CPC ...... *H04L 63/1441* (2013.01); *H04L 67/1078* (2013.01); *H04L 67/1097* (2013.01); *H04L 9/3239* (2013.01)

(56) References Cited

U.S. PATENT DOCUMENTS

| | | | |
|---|---|---|---|
| 9,668,005 B2* | 5/2017 | Song | H04N 21/23614 |
| 2011/0113099 A1 | 5/2011 | Teng et al. | |
| 2012/0027134 A1* | 2/2012 | Gladwin | G06F 21/6218 375/340 |
| 2012/0254690 A1* | 10/2012 | Resch | G06F 3/065 714/763 |
| 2013/0195106 A1* | 8/2013 | Calmon | H04L 45/24 370/389 |
| 2014/0016469 A1 | 1/2014 | Ho et al. | |
| 2014/0250301 A1 | 9/2014 | Chang et al. | |
| 2016/0269102 A1* | 9/2016 | Park | H04L 1/0057 |
| 2017/0026468 A1 | 1/2017 | Kumar et al. | |
| 2017/0126852 A1* | 5/2017 | Narasimha | H04L 45/24 |
| 2019/0156301 A1* | 5/2019 | Bentov | G06Q 20/065 |

OTHER PUBLICATIONS

Avci et al., "Recovery from Link Failures in Networks with Arbitrary Topology via Diversity Coding," Jun. 17, 2011, 6 pages.

Ayanoglu et al., "Diversity Coding for Transparent Self-Healing and Fault-Tolerant Communication Networks," IEEE Transactions on Communication, (41)11: Nov. 1993, 10 pages.

Biryukov et al., "Deanonymisation of clients in Bitcoin P2P network," Proceedings of the 2014 ACM SIGSAC Conference on Computer and Communications Security, Nov. 3, 2014, 15 pages.

Chih-Lin et al., "Transparent Self-Healing Communication Networks via Diversity Coding," retrieved from https://ieeexplore.ieee.org/document/117132, Apr. 16-19, 1990, 6 pages.

International Search Report and Written Opinion for Application No. PCT/IB2019/051782, dated Jun. 3, 2019, filed Mar. 6, 2019, 10 pages.

Karthick et al., "Network Coding based Reliable and Efficient Data Transfer for Smart Grid Monitoring," International Conference on Advanced Networks and Telecommunications Systems Hyderabad, India, May 5, 2014, 6 pages.

Kok et al., "Improving Network Coding in Wireless Ad Hoc Networks," Science Direct, 2015, 19 pages.

Li et al., "Random Network Coding in Peer-to-Peer Networks: From Theory to Practice," (99)3: Mar. 2011, 11 pages.

Zeng et al., "Delay-Energy lower bound on Two-Way Relay Wireless Network Coding," Jan. 24, 2014, 9 pages.

Antonopoulos, "Mastering Bitcoin—Unlocking Digital Cryptocurrencies," O'Reilly Media, Inc., Dec. 20, 2014, 282 pages.

Nakamoto, "Bitcoin: A Peer-to-Peer Electronic Cash System," Bitcoin, Oct. 31, 2008, https://bitcoin.org/bitcoin.pdf, 9 pages.

Satoshi et al., "Connection Limits," Bitcoin Forum, Aug. 9, 2010, https://bitcointalk.org/index.php?topic=741.0;prev_next=prev, 2 pages.

* cited by examiner

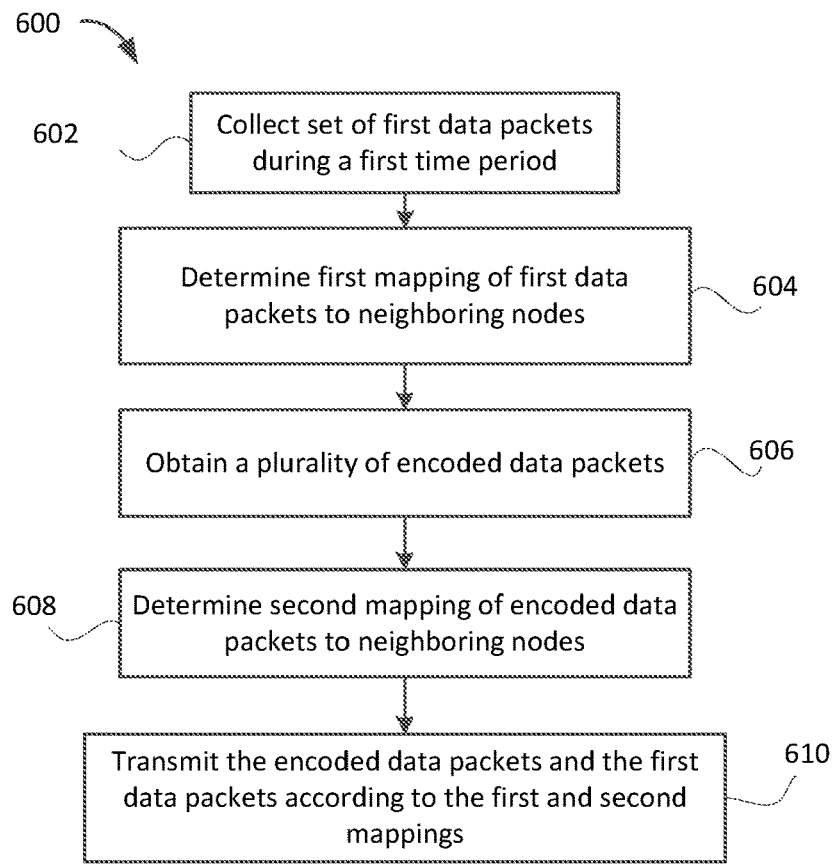
FIG. 6a
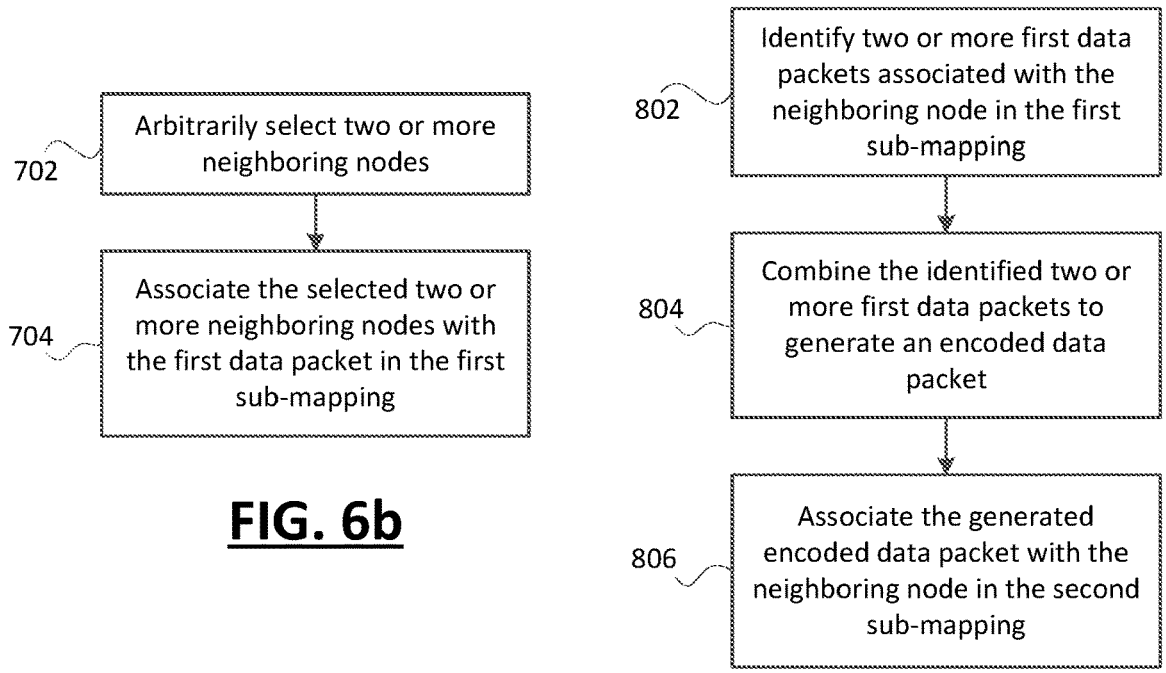
FIG. 6b
FIG. 6c

SYSTEMS AND METHODS FOR RANDOM DIFFERENTIAL RELAY AND NETWORK CODING

This invention relates generally to computer networks, and more particularly to methods and devices to propagate data in a network of nodes, electronic communications, and networking technologies. It is particularly suited for use in relation to blockchain technologies. In particular, it relates to secure transmission of data, and for the reduction of potentially malicious events by third parties, i.e. attacks.

In this document we use the term 'blockchain' to include all forms of electronic, computer-based, distributed ledgers. These include, but are not limited to, blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "Bitcoin" is used herein to refer to all variations or version deriving or based on the Bitcoin protocol.

A blockchain is a consensus-based, electronic ledger which is implemented as a computer-based decentralised, distributed system made up of blocks, which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

Network nodes that receive a new transaction will quickly try to push that transaction out to other nodes in the network. Before transmitting a new transaction to other nodes, it is "validated", meaning it is checked against a set of criteria to ensure the transaction meets the basic requirements for a proper transaction according to the applicable blockchain protocol.

In order for a transaction to be written to the blockchain, it is incorporated into a block by a node (a "miner" or "mining node") that is designed to collect transactions and form them into blocks. The miner then attempts to complete a "proof of work" with respect to the node. Miners throughout the blockchain network compete to be the first to assemble a block of transactions and complete the associated proof of work for that block. The successful miner adds its confirmed block to the blockchain and the block is propagated through the network so that other nodes that maintain a copy of the blockchain can update their records. Those nodes receiving a block also "validate" that block and all the transactions in it to ensure it complies with the formal requirements of the protocol.

One of the perceived advantages of blockchain technology, such as Bitcoin, is the anonymity of transactions. Personal details of a Bitcoin user are not formally and explicitly attached to Bitcoin addresses, and the Bitcoin ledger of the blockchain only contains public address information. However, since a blockchain is structured as a distributed, peer-to-peer network operating on top of the Internet, anonymity of transactions may be compromised by attacks that use Internet Protocol (IP) address information to link users with network activity. By way of illustration, de-anonymization attacks, such as IP traffic analysis, conducted on a blockchain-based network may enable interested third-parties to monitor transactions submitted by users on the network and use publicly available information to link the transactions to their sources, for example, by linking user's public keys with their IP addresses.

Traffic analysis is particularly problematic for a blockchain-based network, which relies on propagation of transactions by and between network nodes. Each node in the network that receives a transaction validates the transaction and subsequently sends it to peer nodes. In the Bitcoin protocol, a node will send an "INV" message containing a list of transactions to a peer node and receive a "GETDATA" response message selecting some subset of the transactions advertised in the "INV" message. The node then sends the requested transactions to the peer node. This process is carried out with respect to each peer node to which the node is connected. An attacker may intercept and analyse data that is transmitted when transactions are propagated in the network, and ultimately gain information, which can be used to link sources and destinations of transactions.

It would be desirable to provide techniques for propagating transactions in blockchain-based networks, which can reduce the likelihood of compromise of network anonymity through traffic analysis or other types of de-anonymization attacks. More generally, it would be desirable to provide techniques for relaying data between nodes of a peer-to-peer network to reduce the vulnerability to de-anonymization attacks.

Such a solution has now been devised.

Thus, in accordance with the present invention there are provided methods and devices as defined in the appended claims.

The invention may provide a node to propagate data packets in a network of nodes. Each node in the network may have one or more connections to other nodes. The node may include a processor, a network interface to provide network connectivity, and memory. The memory may include processor-executable instructions that, when executed by the processor, cause the processor to perform one or more of the operations set out below. The node may be arranged to: collect a set of first data packets during a first time period, the set including at least one data packet received from one or more first nodes in the network. The instructions may cause the processor to obtain a plurality of encoded data packets, each one of the plurality of encoded data packets being generated by combining two or more first data packets of the set using network coding. The instructions may cause the processor to determine a mapping of the plurality of encoded data packets and the first data packets of the set to one or more neighbouring nodes connected to the node, and may transmit the plurality of encoded data packets and the first data packets of the set to the one or more neighbouring nodes according to the determined mapping.

In some implementations, the first time period has a predefined length.

In some implementations, determining the mapping includes determining a first sub-mapping of the first data packets of the set to the one or more neighbouring nodes and a second sub-mapping of the plurality of encoded data packets to the one or more neighbouring nodes, the first and second sub-mappings indicating expected time of relay of each of the first data packets of the set and the plurality of encoded data packets to the one or more neighbouring nodes.

In some implementations, determining the first sub-mapping includes, for each first data packet of the set: arbitrarily selecting two or more neighbouring nodes connected to the node, and associating the selected two or more neighbouring nodes with the first data packet in the first sub-mapping.

In some implementations, obtaining the plurality of encoded data packets includes, for each of the one or more neighbouring nodes: identifying two or more first data packets that are associated with the neighbouring node in the first sub-mapping, and combining the identified two or more first data packets to generate an encoded data packet.

In some implementations, transmitting the plurality of encoded data packets and the first data packets of the set to the one or more neighbouring nodes according to the determined mapping includes, for each of one or more of the first data packets of the set: determining a next scheduled time of relay of the first data packet to neighbouring nodes, and relaying the first data packet a predetermined amount of time after the next scheduled time of relay.

In some implementations, transmitting the plurality of encoded data packets and the first data packets of the set to the one or more neighbouring nodes according to the determined mapping includes, for each of one or more of the encoded data packets: determining a next scheduled time of relay of the encoded data packet to neighbouring nodes, and relaying the encoded data packet a predetermined amount of time after the next scheduled time of relay.

In some implementations, transmitting the plurality of encoded data packets and the first data packets of the set to the one or more neighbouring nodes according to the determined mapping includes, for each of at least one of the neighbouring nodes: determining that the neighbouring node has two or more associated first data packets in the first sub-mapping, and transmitting a subset of the two or more associated first data packets to the neighbouring node.

The present application may describe a computer-implemented method of propagating data packets in a network of nodes. Each node in the network may have one or more connections to other nodes. The method, which may be implemented at one of the nodes, may include collecting a set of first data packets during a first time period, the set including at least one data packet received from one or more first nodes in the network. The method may include obtaining a plurality of encoded data packets, each one of the plurality of encoded data packets being generated by combining two or more first data packets of the set using network coding. The method may include determining a mapping of the plurality of encoded data packets and the first data packets of the set to one or more neighbouring nodes connected to the node, and transmitting the plurality of encoded data packets and the first data packets of the set to the one or more neighbouring nodes according to the determined mapping.

The present application may further describe a non-transitory processor-readable medium storing processor-executable instructions to participate in a process for propagating data packets in a network of nodes, wherein the processor-executable instructions, when executed by a processor in one of a plurality of participating nodes, cause the processor to carry out the operations of one or more of the methods described herein.

The present application may describe solutions for providing node-level anonymization in a network. More particularly, the methods and systems described herein may facilitate obfuscating the functions of nodes in a data propagation scheme within a network. Even if an attacker were to monitor inter-node traffic in a network or gain access to neighbouring nodes of specific nodes, the present methods may make it challenging for such an attacker to determine whether a particular node is the source or a relaying node for data packets that are being propagated in the network. By obfuscating the functions/roles of nodes in a blockchain network, the efficacy of de-anonymization attacks on the network may be reduced and security of data transmission on the blockchain may be improved.

In many of the example implementations described herein, specific reference is made to blockchain transactions; however, it will be appreciated that the methods and devices described herein may be implemented and applied in connection with non-blockchain data propagation. More generally, the methods and devices described in the present disclosure may be suitable for use in propagating various different types of data among the nodes of a peer-to-peer network.

Any feature described in relation to one aspect or embodiment of the invention may also be used in respect of one or more other aspects/embodiments. These and other aspects of the present invention will be apparent from, and elucidated with reference to, the embodiments described herein. An embodiment of the present invention will now be described, by way of example only, and with reference to the accompanying drawings, in which:

FIG. 1 illustrates an example network associated with a blockchain.

FIG. 2 diagrammatically shows an example blockchain node with an input buffer and an output buffer.

FIG. 6a-6c show, in flowchart form, another example process for propagating data packets in a blockchain network, in accordance with the DMP.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
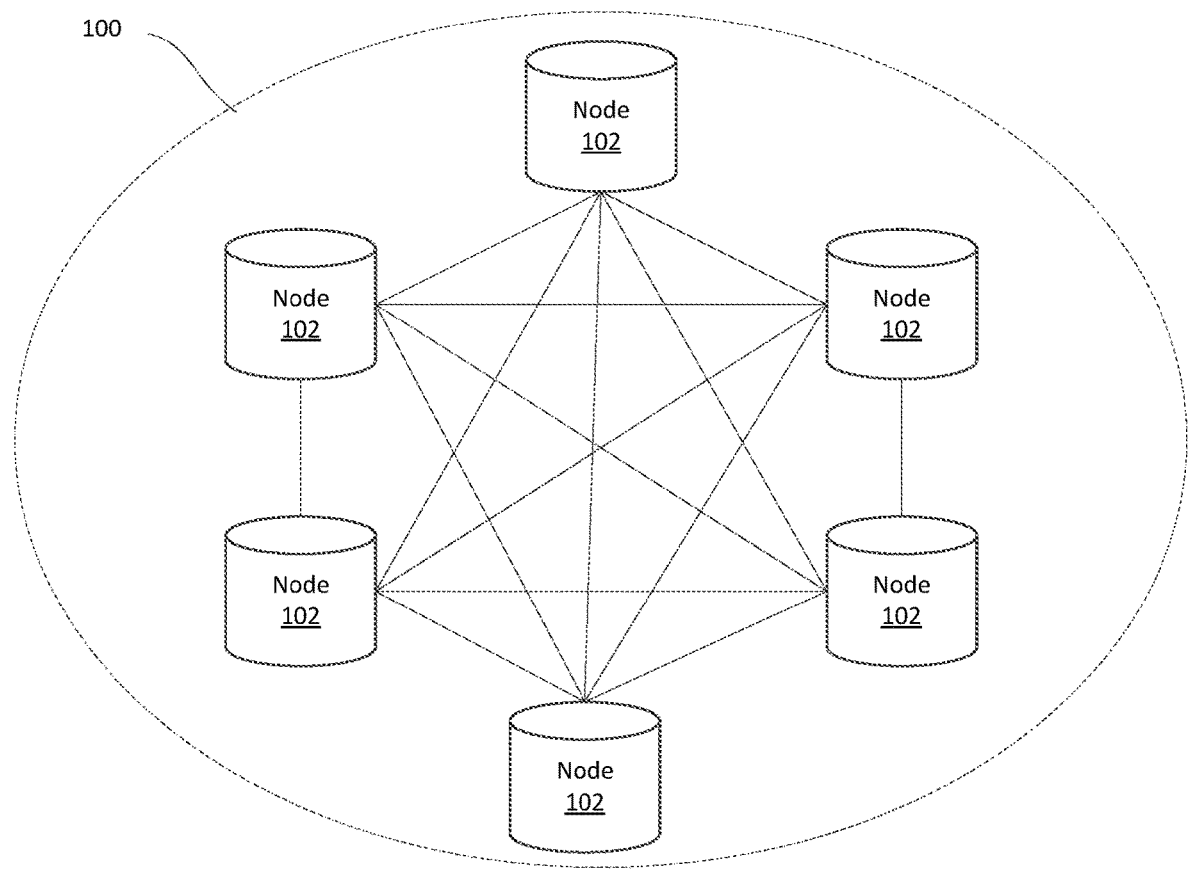

Reference will first be made to FIG. 1 which illustrates, in block diagram form, an example network associated with a blockchain, which may be referred to herein as a blockchain network 100. The blockchain network 100 is a peer-to-peer open membership network, which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the nodes 102 may be located in geographically dispersed locations.

Nodes 102 maintain a global ledger of all transactions on the blockchain, grouped into blocks, each of which contains a hash of the previous block in the chain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output (UTXO). A subsequent transaction may then reference that address as an input in order to spend or disperse that value.

Nodes 102 can fulfil numerous different functions, from network routing to wallet services, to maintain a robust and secure decentralized public ledger. "Full nodes" contain a complete and up-to-date copy of the blockchain, and can therefore verify any transactions (spent or unspent) on the public ledger. "Lightweight nodes" (or SPV) maintain a subset of the blockchain and can verify transactions using a "simplified payment verification" technique. Lightweight nodes only download the headers of blocks, and not the transactions within each block. These nodes therefore rely on peers to verify their transactions. "Mining nodes", which can be full or lightweight nodes, are responsible for validating transactions and creating new blocks on the blockchain. "Wallet nodes", which are typically lightweight nodes, handle wallet services of users. Nodes 102 communicate with each other using a connection-oriented protocol, such as TCP/IP (Transmission Control Protocol).

When a node wishes to send a transaction to a peer, an "INVENTORY" message is sent to the peer, transmitting one or more inventory objects that is known to the transmitting node. If the peer replies with a "GETDATA" message, i.e. a full transaction request, the transaction is sent using a "TRANSACTION" message. The node receiving the transaction forwards it in the same manner—given that it is a valid transaction—to its peers.

Figure 2:
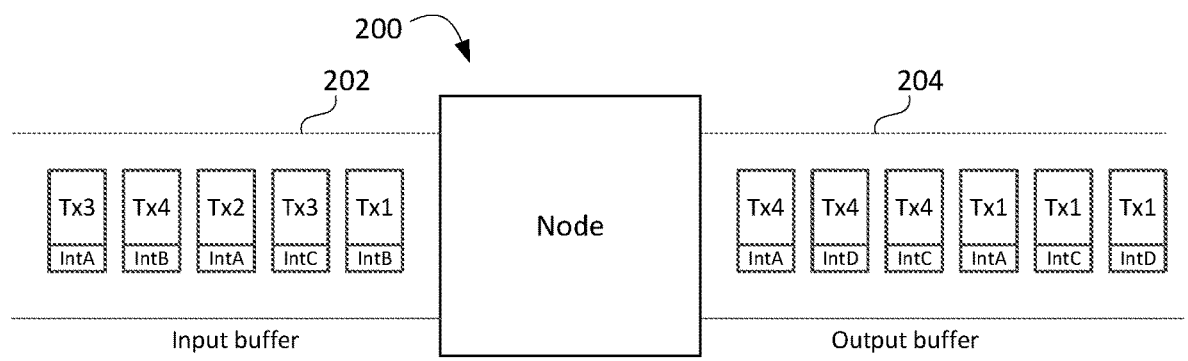

Reference is now made to FIG. 2, which diagrammatically shows an example node 200 with an input buffer 202 and an output buffer 204. The example node 200 has network interfaces with multiple peer nodes, referenced as intA, intB, intC, intD, etc. The input buffer 202 shows incoming transactions from the various peer nodes, and the output buffer 204 shows output network packets, corresponding to transactions, for transmission to peer nodes over the respective interfaces. Network packets are serially sent and received at an application-level according to the primitives provided by the operating system of the node 200. Assuming that a transaction x fits in a single Ethernet/IP packet, its transmission to m peers requires the buffering of m different output network packets. Both input and output network packets, along with other information, will contain a serialized transaction and a logical interface ID representing the TCP/IP connection to the sending/receiving peer.

Once a Bitcoin transaction is generated, the source node broadcasts the transaction message over the network. Generally, when a client generates a transaction, it is put in the output buffer 204. The transaction may or may not be forwarded immediately to the peers. In current implementations of the Bitcoin network, transactions are propagated by a mechanism known as "diffusion propagation", whereby each transaction source transmits the transaction to its neighbours with an independent, exponential delay. The delays in propagation are random, and are useful to introduce uncertainty in timing estimates for a malicious attacker. Once a peer receives a certain transaction, the peer may not accept future relays of the same transaction; for example, the transaction hash may be stored in the peer's memory pool, allowing the peer to reject identical transactions. The "diffusion" of transactions through the network is symmetric, meaning that a forwarding node does not use information about the IP addresses of the neighbouring nodes to influence the transaction broadcast. For example, in "standard" diffusion processes (utilized in the Bitcoin protocol), the peers of a broadcasting node all receive the same transaction and in each relay instance, only one transaction at a time is relayed per peer. The symmetric nature of this "diffusion" may be exploited by malicious third parties having knowledge of the peer-to-peer graph structure of the network in conducting de-anonymizing attacks.

The present disclosure provides alternative techniques for data relay on blockchain networks, to improve protection against traffic analysis attacks. More particularly, the proposed relay protocols may be used to disguise, conceal, or obfuscate connections between source nodes of data packets and their IP addresses.

The present application also describes methods and devices that facilitate fast propagation of data packets. In some implementations, nodes selectively enable the use of network coding to combine two or more data packets into a single message for sending to peer nodes. The selective use of network coding may be based on determining that the node is a potential bottleneck. A bottleneck, in the context of a network of nodes, is a link (edge) between nodes which limits the performance of the network by, for example, slowing down the transmission of data packets. The source of a bottleneck (link between nodes) is a node. In general, the determination of whether a node is likely a bottleneck may be based on whether the number of in-links (fan-in) to the node exceeds the number of out-links (fan-out) from the node.

The introduction of network coding may increase the efficiency of data transmission in a network of nodes, such as a blockchain network.

A data relay protocol, Diffusion Mixer Protocol (DMP), is proposed. DMP includes two independent diffusion stages. The first stage ("random differential relay", or RDR) allows for relayed data packet mixing and obfuscation of data packet sources. During the random differential relay stage, each node waits a predefined amount of time before broadcasting a data packet to the network, to receive and collect a plurality of data packets from its peers. The node then creates outgoing connections to its "entry nodes", and sends to an arbitrarily (e.g. randomly) selected subset of these entry nodes different data packets with approximately the same timestamps. The entry nodes of a node are those neighbouring nodes to which direct outgoing connections can be established from the node. The randomness in the choice of entry nodes and the diversity in the relayed data may make the reconstruction of the network topology more difficult for an attacker.

The second stage ("standard diffusion") ensures a timely and reliable propagation of data packets within the network. In the standard diffusion stage, each node relays the same data packets to all its entry nodes, and in each relay instance only one data packet at a time is relayed per entry node.

It should be noted that in a network of nodes, such as a blockchain network, one or more of the nodes may be capable of implementing the DMP. Specifically, one or more of the nodes of the network may be able to relay its received data packets to its entry nodes by participating in the DMP. A participating node may, for example, select between an RDR process and a standard diffusion process, for propagating a particular data packet. The nodes of the network may elect to participate in the DMP, joining the protocol either via a decentralized manner or through inclusion in a group of participating nodes assembled by a central authority. A participating node relays its output data packets according to the DMP. In particular, if a participating node receives a data packet, the node may forward the received data packet according to a mode of propagation that is selected for that node, using the rules stipulated by the DMP.

The proposed DMP for data packets relay is described with reference to FIGS. 3 to 7. A schematic visualization of the DMP is provided in FIG. 3. An example blockchain network 300 of nodes is shown. Each node represents a network terminal (i.e., a blockchain node), while edges represent links between nodes. For the purposes of this illustration, it is supposed that for each link, it is possible to send or receive a single bit at a time.

In this example network 300, when a node receives a new data packet, it is propagated through the network to all other nodes. Each node is to store the new data packet in their respective local set and forward the new data packets to any peer nodes that do not yet have the new data packets. Due to the peer-to-peer nature of the blockchain network 300, all nodes do not receive a new data packet at the same time, meaning it will take some time for a new data packet to reach all nodes in the network 300.

Figure 3:
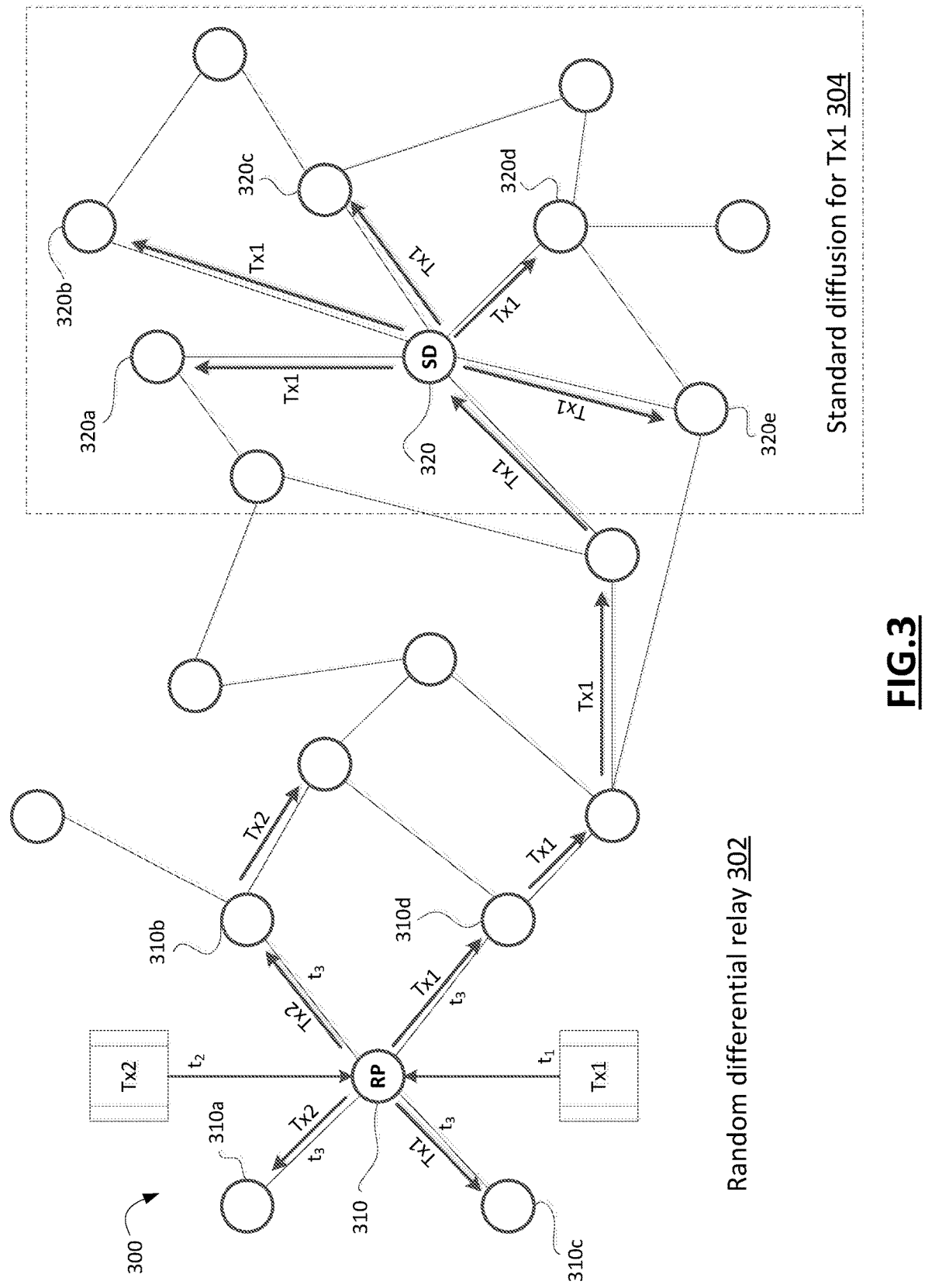
FIG. 3 is a schematic diagram of a protocol, Diffusion Mixer Protocol (DMP), for propagating a data packet in an example network of nodes.

FIG. 3 illustrates the two stages of the DMP for propagating a particular data packet Tx1, namely the random differential relay 302 and the standard diffusion 304 for Tx1. The source node 310 of data packet Tx1 may either generate the data packet Tx1 or receive it from a peer node, at a time, $t_1$. In accordance with the DMP, source node 310 waits to receive at least one more incoming data packet from its neighbouring nodes prior to initiating broadcast of the received/queued data packet. In the example of FIG. 3, once data packet Tx2 is received by source node 310 at time $t_2$, the data packets Tx1 and Tx2 are sent to an arbitrarily selected subset of the source node 310's entry nodes at time $t_3$. Data packet Tx1 is forwarded to entry nodes 310c and 310d, while data packet Tx2 is forwarded to entry nodes 310a and 310b. The example of FIG. 3 is only illustrative; in particular, the source node 310 may wait to receive more than two incoming data packets before propagating any of its received data packets.

The entry nodes relay the received data packets to their own peers. For example, nodes 310b and 310d forward data packets Tx2 and Tx1, respectively, to one or more of their neighbouring nodes. In the DMP, each recipient of a data packet independently selects a mode of propagating the received data packet. Node 320 is an example of a node which selects standard diffusion as its diffusion mode. As shown in FIG. 3, node 320 forwards the same data packet, Tx1, to all its entry nodes, namely 320a, 320b, 320c, 320d, and 320e.

In accordance with one aspect of the present application, a blockchain node collects/buffers first data packets over a particular time period, and then uses network coding to combine two or more of the collected first data packets to generate encoded data packets. That is, a blockchain node encodes a plurality of first data packets to produce an encoded data packet such that it can be unravelled. The encoded data packet has a size of the largest of the first data packets, plus a small overhead.

Figure 4:
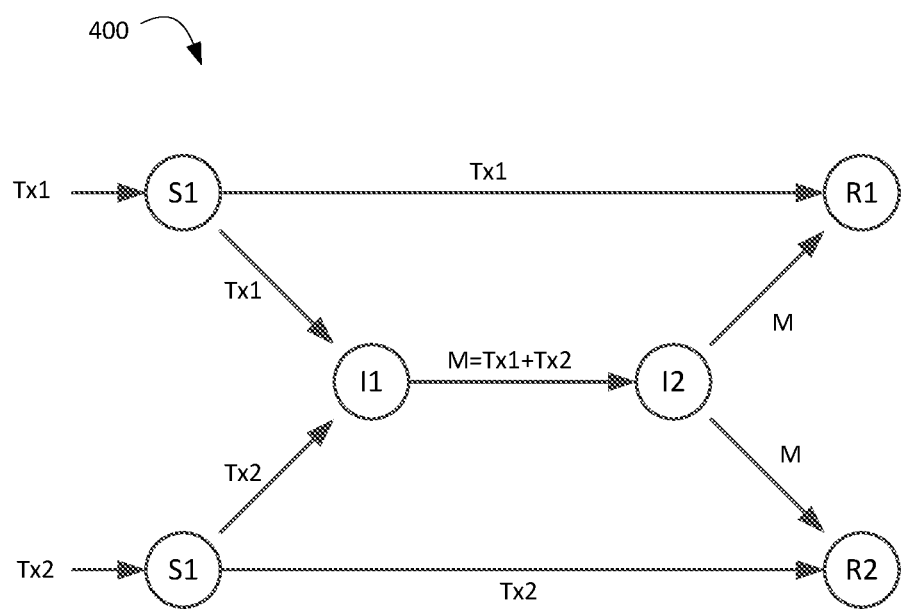
FIG. 4 shows a simplified example network of nodes.

Reference is now made to FIG. 4, which shows a simplified example network of nodes in a network 400. Each node represents a network terminal (e.g. a blockchain node), while edges represent links between nodes. For the purposes of this illustration, it is supposed that for each link, it is possible to send or receive a single bit at a time.

Two of the nodes are labelled as sources, S1 and S2, which receive two new data packets, Tx1 and Tx2, respectively. In this example network 400, when a node receives a new data packet, it is propagated through the network to all other nodes. Each node is to store a newly received data packet and forward the data packet to any peer nodes that do not yet have the data packet. Due to the peer-to-peer nature of the network 400, all nodes do not receive a particular new data packet at the same time, meaning it will take some time for a new data packet to reach all nodes in the network 400.

Two of the nodes of the blockchain network 400 are labelled as receivers, R1 and R2. Nodes I1 and I2 are intermediate nodes, and the link between I1 and I2 represents a bottleneck for the network 400 at time T. When node I1 receives the two new data packets, Tx1 and Tx2, at approximately the same time it must decide which of the two data packets to send first.

Using network coding, the node I1 may combine the new data packets Tx1 and Tx2 into an encoded data packet (e.g. a composite message) M that is the same size as the larger of Tx1 and Tx2. For example, the encoded data packet M may be a linear combination of Tx1 and Tx2. The node I1 sends M to node I2, which then forwards M to receivers R1 and R2. The receivers R1 and R2 are able to recover the individual data packets Tx1 and Tx2. For example, receiver R1 will receive Tx1 and M. Since M is based on a combination of Tx1 and Tx2 (e.g. binary XOR of Tx1 and Tx2), R1 only needs to solve the equations (Tx1, Tx1+Tx2) to derive Tx2. Similarly, R2 will receive Tx2 and need to solve the equations (Tx2, Tx1+Tx2) to derive Tx1.

Bottlenecks can appear or disappear over time, depending on the configuration of the network and where data packets are generated at any given time. A bottleneck is a link (edge) between nodes which heavily limits the performance of the network and, specifically in the case of the blockchain network, slows down the transmission of data packets (e.g. transactions, or blocks). However, the source of a bottleneck (link between nodes) is a node.

Network coding was developed as an alternative to the dominant packet-switched networking of the time. Network coding models a network as a directed graph (N,L) with link capacities, demonstrating that a node n∈N can communicate information to a set of receivers R⊆N at a rate achieving the broadcast capacity h, with h being the value of the minimum cut between s and any r∈R provided encoding at the interior nodes of the network.

A cut C is defined as a partition of the vertices V of a graph G=(V,E) into two disjoint subsets S and T. The cut-set of a cut C=(S,T) is the set {(u,v)∈E|u∈S, v∈T} of edges that have one endpoint in S and the other endpoint in T.

An example methodology for network coding was described by P. A. Chou, Y. Wu, and K. Jain, "Practical Network Coding", in *Proceedings of the annual Allerton conference on communication control and computing*, v. 41, pp. 40-49, The University (2003) (hereinafter "Chou"), which is hereby incorporated by reference. This methodology removed the need for any centralized knowledge of the network topology or the encoding or decoding functions. Chou states that a network N can be represented as an acyclic graph G=(V,E) with unit capacity edges (e), a sender s∈V, and a certain number of receivers T⊆E. Each edge e∈E output for a node v=in(e) has a symbol y(e) which is a linear combination of the symbol y(e') on the edges e' entering v. In particular, the output is given by:

$$y(e) = \Sigma_{e':out(e')=v} m_e(e') y(e')$$

where $y(e_i') = x_i$, $i=1, \ldots, h$, and the vector $m_e$ is the local encoding vector representing the encoding function at node v for the edge e, and h indicates the broadcast capacity as the minimum number of edges in any cut between the sender and receiver.

Chou states that the output y(e) on any edge e∈E is a linear combination $y(e) = \Sigma_{i=1}^{h} g_i(e) x_i$ of the source symbols, and the h-dimensional vector of coefficients $g(e) = [g_1(e), \ldots, g_h(e)]$ can be recursively obtained by $g(e) = \Sigma_{e':out(e')} m_e(e') g(e')$, where $g(e_i')$ on the edge $e_i'$ is initiated to the i-th unit vector. The vector g(e) may be called the global encoding vector along e. Any node t receiving along its h incoming edges the symbols:

$$\begin{bmatrix} y(e_1) \\ \vdots \\ y(e_h) \end{bmatrix} = \begin{bmatrix} g_1(e_1) & \cdots & g_h(e_1) \\ \vdots & \ddots & \vdots \\ g_1(e_h) & \cdots & g_h(e_h) \end{bmatrix} \begin{bmatrix} x_1 \\ \vdots \\ x_h \end{bmatrix} = G_t \begin{bmatrix} x_1 \\ \vdots \\ x_h \end{bmatrix}$$

can recover the source symbols $x_1, \ldots, x_h$ if the matrix $G_t$ of global encoding vectors has rank h.

The global encoding vector for an outgoing edge e may be characterized as being based upon the local encoding of global encoding vectors of incoming edges e'.

It will be appreciated that network coding may be used to propagate data packets through a network. The use of network coding may provide the additional advantage of being able to recover from the loss of two or more nodes, storing data packets, from the network. In particular, because intermediary nodes have received one or more messages containing combined data relating to the data packets, the missing data packet(s) could be recovered from the network coded messages.

Figure 5:
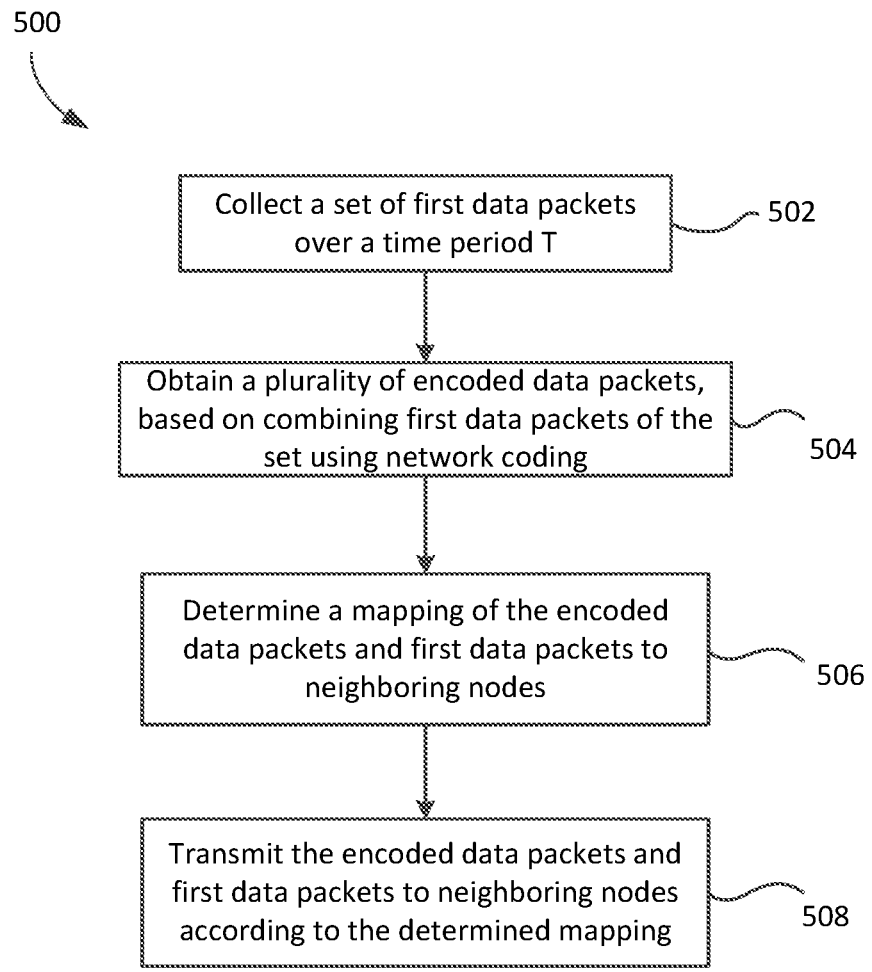
FIG. 5 shows, in flowchart form, an example process for propagating data packets in a blockchain network, in accordance with the DMP.

Reference is now made to FIG. 5, which shows, in flowchart form, an example method 500 for propagating data packets in a network, in the RDR stage of DMP. The method 500 is implemented by a node of, for example, a blockchain network, such as network 100. A node may be understood, in this context, to refer to a mining node, full node, validator node, or other type of discrete blockchain node in the blockchain network. The node is a computing device with network connection(s), computing resources, and executing software implementing the blockchain protocol.

In operation 502, the client associated with the node collects a set of first data packets during a first time period, T. That is, the node accumulates incoming first data packets over a period of time. In the context of a blockchain network, the first data packets may comprise blockchain transactions. The set includes at least one data packet received from one or more peer nodes in the network, i.e. incoming data packets. In a blockchain network, during the time period, T, the node accumulates a set of transactions by monitoring the network for incoming transactions to be relayed. The length of time period T may be predefined. In some example implementations, the length of time may vary based on parameters such as average connection times, average number of data packets received per unit of time, or the node's centrality (i.e. the number of incoming connections to the node) within the network. During the time period T, the node may only be permitted to accumulate first data packets, and therefore may be prevented from transmitting any first data packets for the duration of time period T.

In operation 504, a plurality of encoded data packets are obtained. Each of the encoded data packets is generated by combining two or more first data packets of the set using networking coding and a local encoding vector. For example, a plurality of encoded data packets may be generated by using an XOR networking coding scheme, i.e. encoding comprises XOR coding of first data packets.

As described above, random differential relay represents a departure from the "standard diffusion" protocol for propagating data packets in a network of nodes. In implementing RDR, a propagating node relays different data packets as well as combinations of data packets simultaneously to a randomly selected subset of entry nodes. The propagating node may create a data structure by randomly assigning to each collected data packet one or more entry nodes that the data packet should be relayed to. More generally, a network node that relays data packets to its peers may maintain its own internal routing data structures which specify the type of relay to perform for each of a plurality of data packets collected (i.e. received or locally generated) by the node.

In the context of the Diffusion Mixer Protocol proposed herein, each node in the blockchain network that implements RDR may build its own routing data structure, or "RDR table", independently. An RDR table defines a data packet allocation scheme for each node that adopts the RDR protocol. That is, an individual node's RDR table is used to manage what data packets are to be relayed to which of its peers and when. The RDR table may keep track of all the data packets received or generated in a given amount of time, $\Delta T_{RDR}$, as well as the source peers of data packets. An RDR table may include additional information, such as: time of arrival of the first instance of a data packet ("ToA timestamp"); times chosen for relaying a data packet ("ToR timestamp"); and/or counter of the number of instances of the same data packet received by the node. An example RDR table is provided below.

TABLE 1

| Data packet ID | Sources | Destinations | Data |
|---|---|---|---|
| Tx$_1$ | A, B, D | C, E | ... |
| Tx$_2$ | [local] | A, C, E | ... |
| Tx$_3$ | D, E | A, B | ... |

A node's local RDR table may be updated dynamically (i.e. in real-time) as new information (timeouts, transactions received or generated) becomes available.

In operation 506, the node determines a mapping of the plurality of encoded data packets (generated in operation 504) and the first data packets collected in operation 502 to one or more neighbouring nodes connected to the node. The mapping may indicate an expected time of relay of each encoded data packet and first data packet of the collected set to the neighbouring nodes. This "mapping" is used to construct the individual RDR table for a node of the network. In particular, the mapping indicates the assignment of data packets (that are received or generated at a node) for transmission to its neighbouring nodes.

In operation 508, once the mapping of the encoded data packets and the first data packets of the collected set to neighbouring nodes is determined, said data packets are transmitted to the neighbouring nodes in accordance with the determined mapping. The encoded data packets and the collected first data packets are relayed to the nodes with which they are respectively associated in the mapping determined in operation 506.

Reference is now made to FIG. 6a, which shows, in flowchart form, an example method 600 for propagating data packets in a network, in the RDR stage of DMP. The method 600 is implemented by a node of, for example, a blockchain network, such as network 100. A node may be understood, in this context, to refer to a mining node, full node, validator node, or other type of discrete blockchain node in the blockchain network. The node is a computing device with network connection(s), computing resources, and executing software implementing the blockchain protocol.

In operation 602, the client associated with the node collects a set of first data packets during a first time period, T. The node accumulates incoming first data packets over a period of time, which may have a predefined length.

After period T has expired, in operation 604, a first mapping of the collected first data packets to neighbouring nodes is determined. FIG. 6b shows an example technique for determining the first mapping in operation 604. As shown in operation 702, in some implementations, the node may arbitrarily select a subset of its entry nodes to which different sets of the collected first data packets will be forwarded. That is, for each collected first data packet, the node may arbitrarily select two or more of its entry nodes (i.e. neighbouring nodes, with which the node has outgoing connections), and assign the first data packet to the selected entry nodes. For example, the entry nodes may be selected randomly. The node may, in some implementations, query the network to obtain fresh addresses of its peers. In the Bitcoin network, the node may query one or more database source names (DSN) embedded in Bitcoin Core, BitcoinJ, or other blockchain protocol, and maintained by Bitcoin (or other blockchain) community members. As a response, the node will get one or more DSN records showing the IP addresses of available full nodes which may accept incoming connections. A decentralized version of peer discovery may be implemented by having peers send "ADDR" messages containing their IP addresses and port numbers to a new node that joins the network.

In some implementations, as part of operation 604, one or more of the nodes in a network may maintain a table or other data structure tracking its assignment of each collected first data packet to entry nodes that the first data packet should be relayed to. In the RDR process, multiple data packets can be simultaneously relayed to the same peer node by a forwarding node.

In operation 606, a plurality of encoded data packets are obtained. Each of the encoded data packets is generated by combining two or more of the collected first data packets using networking coding and a local encoding vector. For example, an XOR networking coding scheme may be used to generate the encoded data packets.

In some implementations, the encoded data packets are obtained by combining data packets that are assigned to/associated with the same neighbouring node in the first mapping, determined in operation 604. FIG. 6c shows an example technique for obtaining the encoded data packets. In operation 802, for each of one or more neighbouring nodes, the node identifies two or more first data packets that are associated with the neighbouring node in the first mapping, and combines the identified first data packets to generate encoded data packets. Referring to Table 1, which shows an example first mapping of first data packets (i.e. Tx1-Tx3) to neighbouring nodes (i.e. nodes A-E), data packets Tx2 and Tx3 are both assigned to neighbouring node A, data packets Tx1 and Tx2 are both assigned to neighbouring node C, and data packets Tx1 and Tx2 are both assigned to neighbouring node E. For this example data relay, the encoded data packets Tx1+Tx2 and Tx2+Tx3 may be generated at the node in operation 606.

In operation 608, a second mapping of the generated encoded data packets to neighbouring nodes is determined. The second mapping assigns each of the encoded data packets for transmission to one or more neighbouring nodes. In at least some implementations, the second mapping assigns an encoded data packet to those nodes that are associated with at least one of the constituent first data packets of the encoded data packet in the first mapping. For example, the encoded data packet Tx1+Tx2 may be assigned to neighbouring node C and/or E and encoded data packet Tx2+Tx3 may be assigned to neighbouring node A or C by the second mapping.

In operation 610, the encoded data packets obtained in operation 606 and the first data packets collected in operation 602 are transmitted to neighbouring nodes according to the first and second mappings. In some implementations, the node may determine that a particular neighbouring node has two or more associated first data packets in the first mapping. In such cases, only a subset of the two or more associated first data packets may be transmitted to that neighbouring node. For example, in the example illustrated in Table 1, only the data packet Tx2 may be transmitted to neighbouring node A. Since the encoded data packet Tx2+Tx3 is also transmitted to node A, both Tx2 and Tx3 can be derived at node A (e.g. by XOR operation), even if only one of the two data packets is ultimately relayed to node A. Without knowing the particulars of the networking coding scheme or even of the use of networking coding, an attacker that intercepts a transmission in a network relay may not be able to derive the constituent first data packets of an encoded data packet, if only a subset of the first data packets being combined is transmitted.

It should be noted that the mapping of encoded data packets and collected first data packets to neighbouring nodes may be determined according to an order different from that suggested in method 600. In some implementations, after collecting a set of first data packets, a plurality of encoded data packets may be generated from the collected first data packets using network coding and a first mapping of the encoded data packets to neighbouring nodes may first be determined. For example, the first mapping may assign each encoded data packet to an arbitrarily selected subset of neighbouring nodes. A second mapping of the collected first data packets to neighbouring nodes can then be determined. In particular, the second mapping may assign a first data packet to those nodes which are associated with encoded data packets that combine the first data packet with one or more other data packets in the first mapping.

In some implementations, the relay of the first data packets and encoded data packets can be scheduled such that delays are introduced to the actual transmission of the data packets to neighbouring nodes. For example, for each of one or more of the collected first data packets, a next schedule time of relay of the first data packet to neighbouring nodes may be determined, and the actual relay of the first data packet may be delayed by a predetermined amount of time. That is, the first data packet may be relayed a predetermined amount of time after the next scheduled time of relay. Similarly, for each of one or more of the encoded data packets, a next scheduled time of relay of the encoded data packet to neighbouring nodes may be determined, and the actual relay of the data packet may be effected a predetermined amount of time after the next scheduled time of relay.

Figure 7:
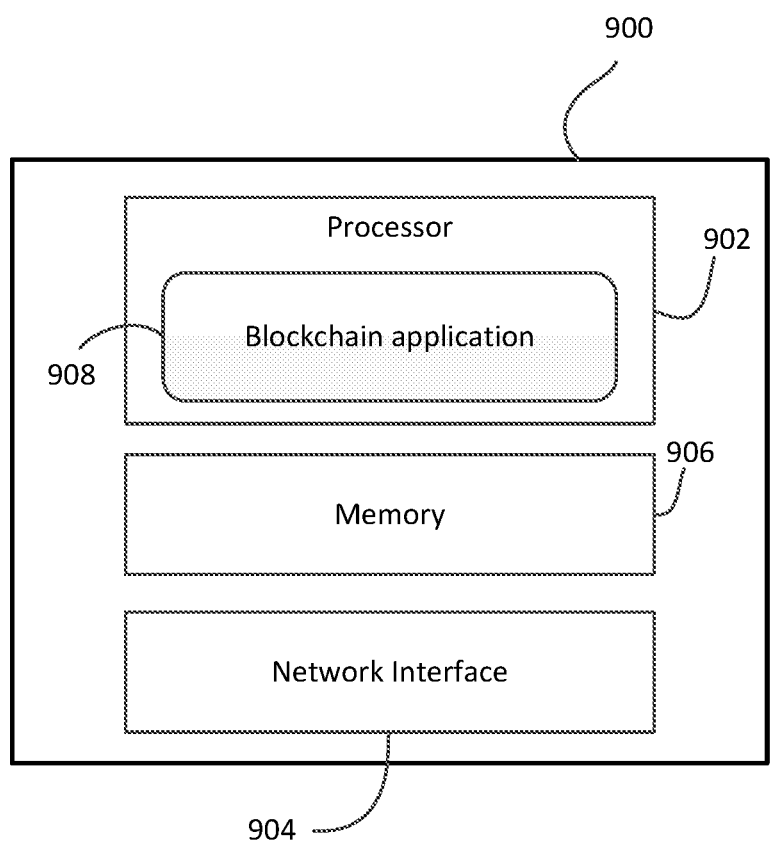
FIG. 7 shows, in block diagram form, an example blockchain node.

Reference will now be made to FIG. 7, which shows, in block diagram form, a simplified example of a participating node 900. The node 900 includes a processor 902, which may include one or more microprocessors, application specific integrated chips (ASICs), microcontrollers, or similar computer processing devices. The node 900 further includes memory 904, which may include persistent and non-persistent memory, to store values, variables, and in some instances processor-executable program instructions, and a network interface 906 to provide network connectivity over wired or wireless networks.

The node 900 includes a processor-executable blockchain application 908 containing processor-executable instructions that, when executed, cause the processor 902 to carry out one or more of the functions or operations described herein.

It will be understood that the devices and processes described herein and any module, routine, process, thread, application, or other software component implementing the described method/process for configuring the blockchain node may be realized using standard computer programming techniques and languages. The present application is not limited to particular processors, computer languages, computer programming conventions, data structures, or other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A network node comprising a processor and memory, the memory storing instructions that, as a result of execution by the processor, cause the network node to:
   collect a set of first data packets during a first time period, the set including at least one data packet received from one or more first nodes in the network;
   obtain a plurality of encoded data packets, each one of the plurality of encoded data packets being generated by combining two or more first data packets of the set using network coding;
   determine a mapping of the plurality of encoded data packets and the first data packets of the set to one or more neighbouring nodes connected to the node, wherein:
      determining the mapping comprises determining a first sub-mapping of the first data packets of the set to the one or more neighbouring nodes and a second sub-mapping of the plurality of encoded data packets to the one or more neighbouring nodes, the first and second sub-mappings indicating expected time of relay of each of the first data packets of the set and the plurality of encoded data packets to the one or more neighbouring nodes; and
      determining the first sub-mapping comprises:
         for each first data packet of the set:
            arbitrarily selecting two or more neighbouring nodes connected to the node; and
            associating the selected two or more neighbouring nodes with the first data packet in the first sub-mapping; and
   transmit the plurality of encoded data packets and the first data packets of the set to the one or more neighbouring nodes according to the determined mapping.

2. The node claimed in claim 1, wherein the first time period has a predefined length.

3. The node claimed in claim 1, wherein obtaining the plurality of encoded data packets comprises: for each of the one or more neighboring nodes: identifying two or more first data packets that are associated with the neighboring node in the first sub-mapping; and combining the identified two or more first data packets to generate an encoded data packet.

4. A node according to claim 1, wherein transmitting the plurality of encoded data packets and the first data packets of the set to the one or more neighbouring nodes according to the determined mapping comprises:
   for each of one or more of the first data packets of the set:
      determining a next scheduled time of relay of the first data packet to neighbouring nodes; and
      relaying the first data packet a predetermined amount of time after the next scheduled time of relay.

5. A node according to claim 1, wherein transmitting the plurality of encoded data packets and the first data packets of the set to the one or more neighbouring nodes according to the determined mapping comprises:
   for each of one or more of the encoded data packets:
      determining a next scheduled time of relay of the encoded data packet to neighbouring nodes; and
      relaying the encoded data packet a predetermined amount of time after the next scheduled time of relay.

6. The node claimed in claim 1, wherein transmitting the plurality of encoded data packets and the first data packets of the set to the one or more neighbouring nodes according to the determined mapping comprises:

for each of at least one of the neighbouring nodes:
  determining that the neighbouring node has two or more associated first data packets in the first sub-mapping; and
  transmitting a subset of the two or more associated first data packets to the neighbouring node.

7. A computer-implemented method of propagating data packets in a network of nodes, each node in the network having one or more connections to other nodes, the method, implemented at one of the nodes, comprising:
  collecting a set of first data packets during a first time period, the set including at least one data packet received from one or more first nodes in the network;
  obtaining a plurality of encoded data packets, each one of the plurality of encoded data packets being generated by combining two or more first data packets of the set using network coding;
  determining a mapping of the plurality of encoded data packets and the first data packets of the set to one or more neighbouring nodes connected to the node, wherein:
    determining the mapping comprises determining a first sub-mapping of the first data packets of the set to the one or more neighbouring nodes and a second sub-mapping of the plurality of encoded data packets to the one or more neighbouring nodes, the first and second sub-mappings indicating expected time of relay of each of the first data packets of the set and the plurality of encoded data packets to the one or more neighbouring nodes; and
    determining the first sub-mapping comprises:
      for each first data packet of the set:
        arbitrarily selecting two or more neighbouring nodes connected to the node; and
        associating the selected two or more neighbouring nodes with the first data packet in the first sub-mapping; and
  transmitting the plurality of encoded data packets and the first data packets of the set to the one or more neighbouring nodes according to the determined mapping.

8. The method of claim 7, wherein the first time period has a predefined length.

9. The method of claim 7, wherein obtaining the plurality of encoded data packets comprises:
  for each of the one or more neighbouring nodes:
    identifying two or more first data packets that are associated with the neighbouring node in the first sub-mapping; and
    combining the identified two or more first data packets to generate an encoded data packet.

10. The method of claim 7, wherein transmitting the plurality of encoded data packets and the first data packets of the set to the one or more neighbouring nodes according to the determined mapping comprises:
  for each of at least one of the neighbouring nodes:
    determining that the neighbouring node has two or more associated first data packets in the first sub-mapping; and
    transmitting a subset of the two or more associated first data packets to the neighbouring node.

11. A non-transitory processor-readable medium storing processor-executable instructions to participate in a process for propagating data packets in a network of nodes, wherein the processor-executable instructions, when executed by a processor of a node of the network of nodes, cause the processor to carry out the method claimed in claim 7.

12. A non-transitory processor-readable medium storing processor-executable instructions to participate in a process for propagating data packets in a network of nodes, wherein the processor-executable instructions, when executed by a processor of a node of the network of nodes, cause the processor to carry out the method claimed in claim 8.

13. A non-transitory processor-readable medium storing processor-executable instructions to participate in a process for propagating data packets in a network of nodes, wherein the processor-executable instructions, when executed by a processor of a node of the network of nodes, cause the processor to carry out the method claimed in claim 7.

14. A system, comprising:
  one or more processors; and
  memory storing processor-executable instructions to participate in a process for propagating data packets in a network of nodes, wherein the processor-executable instructions, when executed by the one or more processors, cause the processor to carry out the method claimed in claim 7.

15. A system, comprising:
  one or more processors; and
  memory storing processor-executable instructions to participate in a process for propagating data packets in a network of nodes, wherein the processor-executable instructions, when executed by the one or more processors, cause the processor to carry out the method claimed in claim 8.

16. A system, comprising: one or more processors; and memory storing processor-executable instructions to participate in a process for propagating data packets in a network of nodes, wherein the processor-executable instructions, when executed by the one or more processors, cause the processor to carry out the method claimed in claim 7.

* * * * *